INVENTOR.
ANTHONY J. HORNFECK

Nov. 28, 1950　　A. J. HORNFECK　　2,531,682
MEASURING AND CONTROLLING SYSTEM
Original Filed Oct. 14, 1946　　2 Sheets-Sheet 2

INVENTOR.
ANTHONY J. HORNFECK
BY
Raymond D. Jenkins
ATTORNEY

Patented Nov. 28, 1950

2,531,682

UNITED STATES PATENT OFFICE 2,531,682

MEASURING AND CONTROLLING SYSTEM

Anthony J. Hornfeck, Lyndhurst, Ohio, assignor to Bailey Meter Company, a corporation of Delaware Original application October 14, 1946, Serial No. 703,146, now Patent No. 2,482,064, dated September 13, 1949. Divided and this application September 22, 1948, Serial No. 50,630

6 Claims. (Cl. 318—28)

My invention relates to systems for measuring and/or controlling the magnitude of a variable, such as temperature, pressure or the rate of fluid flow, and more particularly to apparatus for preventing hunting in such systems.

A system of the type contemplated may include means producing an electromotive force which varies in accordance with the variations in magnitude of a condition under measurement, and means for applying the electromotive force to unbalance a normally balanced electrical network and thereby initiate operation of a driving means having inertia and operating to effect a rebalancing adjustment of the network. The means for applying the electromotive force includes provisions which operate as soon as the driving means is started to reduce the value of the E. M. F. applied to something less than the full change of the E. M. F. produced by the variation in the condition, and to permit the E. M. F. applied to increase the value of the full change as the network becomes balanced. The reduction of the applied E. M. F. and its increase to the full change is such that the inertia of the driving system is compensated for, and hunting of the system about the balance point is prevented. The full change of the E. M. F. is applied to the driving means until the latter starts operating to rebalance the network, and then the E. M . F. is reduced in proportion to the speed of the driving means. Such application of E. M. F. assures a quick starting of the driving means followed by a deceleration of the latter as the unbalance of the network is reduced, and a balanced condition is gradually reached without hunting of the driving means.

It is desirable that the driving means be decelerated since the inertia of the latter tends to cause it to travel beyond the proper position for rebalance. When overtravel of the driving means prevails, the network becomes unbalanced in the opposite direction and causes the driving means to reverse its direction of operation, but again the necessary regulation is exceeded and a continuous hunting of the system results.

A preferred form of my invention applied to the controlling of temperature in a furnace may include a thermocouple responsive to the temperature of the furnace and producing an E. M. F. which is opposed to any portion of an E. M. F. across a slide-wire resistance having an adjustable contact. The difference between the E. M. F. of the thermocouple and the E. M. F. across the varying portion of the slide-wire may be applied to a bridge circuit for unbalancing the latter and effecting operation of a motor which positions the adjustable contact of the slide-wire until the E. M. F. across the varying portion of the slide-wire equals the E. M. F. of the thermocouple. In order to prevent overtravel of the motor by reason of any inertia it might have, there is provided means for introducing into the bridge supply circuit an E. M. F. which varies in value with the speed of the motor and opposes the unbalanced E. M. F. between the thermocouple and the slide-wire. The opposing E. M. F. introduced into the supply circuit may be adjusted to such a value that the E. M. F. applied to the bridge will cause an unbalance of the latter as required to compensate for the inertia of the driving motor and effect a rebalance without hunting taking place.

An object of my invention is to provide an improved measuring or control system. Another object is to provide a measuring or control system having an improved anti-hunting means. Yet another object is to provide in a motor balanced electrical system an improved means for introducing an E. M. F. into the system in proportion to the operation of the motor for preventing a hunting of the latter. Other objects of my invention will appear in the course of the following description.

There are shown in the accompanying drawings several forms which my invention may assume in practice. In these drawings.

Figure 1:
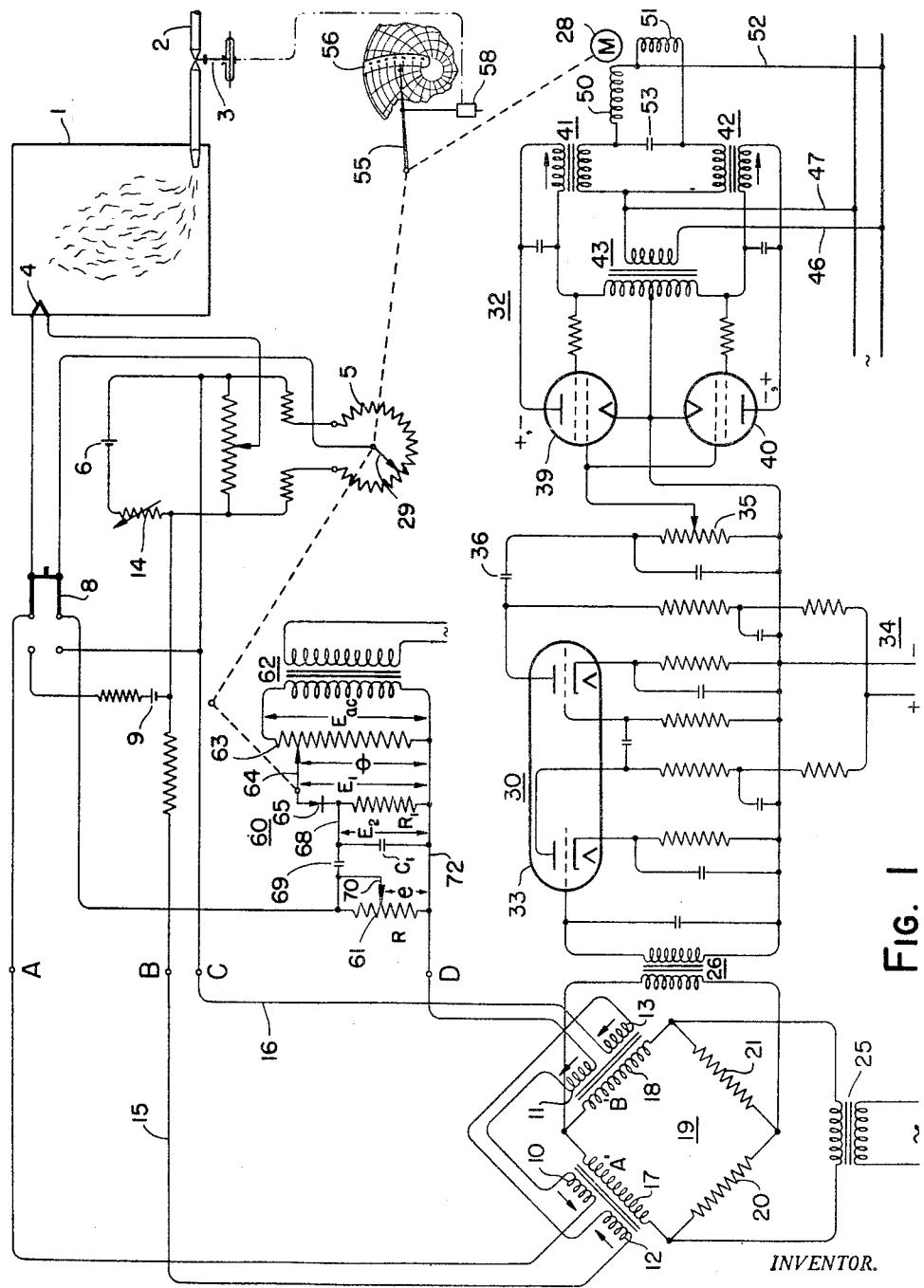
Fig. 1 is a schematic diagram of a measuring and control system in which my invention is incorporated.

In each form of my invention there is shown an arrangement for measuring and controlling the temperature of a furnace 1 to which fuel is supplied through a conduit 2 under the control of a pneumatically actuated valve 3. Arranged in heat transfer relation with the furnace is a thermocouple 4 which is connected in a standard potentiometer circuit including a balancing potentiometer resistance 5 and a battery 6. A double-pole double-throw switch 8 is provided for connecting either the thermocouple-potentiometer circuit or a standard cell 9 to the input windings 10 and 11 of reactor converters A' and B', as shown in Fig. 1. Bias windings 12 and 13 of the reactor converters are connected in series across the battery 6 and an adjustable resistance 14 of the potentiometer circuit by conductors 15 and 16.

The reactor converters have impedance windings 17 and 18 connected in adjacent legs of an alternating current bridge 19 which has opposite fixed resistance legs 20 and 21. The interaction of the windings 10, 12 of the reactor converter A' and of the windings 11, 13 of reactor converter B' control the reactance of the windings 17 and 18. As fully disclosed in my copending application Ser. No. 544,586, filed July 12, 1944, now Patent No. 2,447,338 dated August 17, 1948, the reactor converters operate to change a low level direct current signal of given polarity into a greatly amplified alternating current signal of given phase, and to reverse the phase of the alternating current signal 180° when the polarity of the direct current signal is reversed.

A transformer 25 has its primary winding connected to a source of alternating current and its secondary winding connected to diagonally opposite points of the bridge. The remaining diagonally opposite points of the bridge are connected to the primary winding of an output transformer 26. When the bridge is in balance, no current will pass to the output transformer, but an unbalance of the bridge will result in an A.-C. output of a phase depending upon the polarity of the D.-C. in the input circuit. In other words, the phase of the A.-C. signal output of the bridge, effective across the primary of the transformer 26, relative to the phase of the A.-C. from the input transformer 25, depends upon the polarity of the D.-C. input to the control windings 10 and 11, while the magnitude of the signal supplied to the primary of the transformer 26 depends upon the magnitude of the D.-C. signal applied to the control windings 10 and 11. Current flow through the bridge windings 17 and 18 depends upon the reactance of the windings. The polarity and value of the current flow in the D.-C. windings 10 and 11 is determined by the unbalance of the potentiometer measuring circuit, and the unbalance of this circuit is equal to the change of the thermocouple potential produced by a change in the temperature within the furnace.

For rebalancing the system I have provided a motor 28 which is operatively connected to the movable contactor 29 of the balancing resistance 5. Between the output transformer 26 and the motor 28 is an amplifier 30 and a motor control circuit 32 which act to effect an operation of the motor in one direction or the other to position the contactor 29 in a manner to rebalance the system.

The amplifier 30 includes a double triode resistance couple device 33 which is connected to the secondary of the output transformer 26 and operates to produce a pulsating current varying in phase in accordance with the phase variation of the bridge output. The pulsating current results from an intermittent biasing of grids in the device 33 to render the latter conductive or non-conductive of current from a D.-C. supply 34. A resistance 35 connected in the output circuit of the amplifier 30 has alternating current passing therethrough from the D.-C. supply 34 varying in accordance with the conductivity of the device 33. A condenser 36 connected in this output circuit prevents a continuous flow of D.-C. through the resistance 35.

The motor control circuit 32 includes tubes 39 and 40 having their anodes connected respectively through windings of saturable core reactors 41 and 42 to opposite ends of the secondary winding of a power transformer 43. The cathodes of the tubes are connected to the mid point of the secondary winding and to one end of the resistance 35 in the output circuit of the amplifier 30. A movable contactor for the resistance 35 is connected to grids of the tubes 39 and 40. The primary of the power transformer 43 has A.-C. supplied thereto from a power circuit through conductors 46 and 47. It will be seen that with one phase output of the amplifier 30, the tube 39 will be made conductive at such a time that current may flow from the secondary of the power transformer during one-half cycle through the winding of the saturable core reactor 41 and the tube back to the transformer. During the other half of the cycle, the tube 40 will become non-conductive and no current will flow in the motor control circuit. When the phase output of the amplifier reverses, the tube 40 becomes conductive at the proper time to permit current flow during one-half cycle from the power transformer through the saturable core reactor 42, and the tube 39 becomes non-conductive during the other half cycle to prevent current flow at such time.

The circuit for the motor 28 includes stator windings 50 and 51 connected at adjacent ends through a conductor 52 to one side of the A.-C. power line and connected at their opposite ends to windings of the saturable core reactors 41 and 42. Connected between the remote ends of the motor windings 50 and 51 is a condenser 53. The ends of the saturable core reactor windings remote from the motor windings are connected through the conductor 47 to the other side of the A.-C. power line.

When the portion of the motor control circuit including the reactor 41 and the tube 39 is conducting current, the reactance of the output winding of the reactor 41 is reduced to a low value so that current passes readily from the power line through the conductor 47, the output winding of the reactor 41, the motor winding 50 and the conductor 52 to the other side of the power line. Current also passes from the output winding of the reactor 41 through the condenser 53 and the motor winding 51 to the other side of the power line. The condenser will cause the phase of the current in winding 51 to lead that of the current in the winding 50, and the motor will rotate in one direction. A reversal in phase of the amplifier output will cause the portion of the motor control circuit including the reactor 42 and the tube 40 to permit current flow from the power transformer. The reactance of the output winding of the reactor 42 will then be reduced so that current will flow from the power line directly through the motor winding 51 and through the condenser 53 to the winding 50. The phase of the current in winding 50 will then lead that of winding 51, and the motor will rotate in the opposite direction. The connection of the motor to the contactor 29 of the balancing resistance is such that rotation of the motor will position the contactor to rebalance the input circuit and reduce to zero the flow of current which unbalances the bridge and causes the motor to operate.

In order to obtain a visual indication of the temperature in the furnace, there may be provided an indicating arm 55 movable over a scale 56 and operatively connected to the motor 28. To control the pneumatically actuated valve 3, a pilot valve 58 may be connected to the arm 55 and actuated by the latter to control the flow of operating fluid to the valve 3 in a manner to regulate the flow of fuel to the furnace for producing the desired temperature.

With nothing more than that described above, the flow of current through the motor windings 50 and 51 will be in direct proportion to the value of the E. M. F. imposed upon the bridge by the thermocouple-potentiometer circuit. The operation of the motor by this current flow is such that it is apt to travel beyond the point necessary to reduce the E. M. F. to zero. Overtravel results in an unbalance E. M. F. which causes the motor to rotate in the opposite direction. In order to prevent overtravel of the motor, it is proposed that a circuit be provided for introducing into the system, between the thermocouple-potentiometer circuit and the bridge, an E. M. F. which is proportional to the speed of the motor and which opposes the E. M. F. of the thermocouple-potentiometer circuit.

In Fig. 1 I have shown a circuit generally designated 60 for producing, across a resistance 61 in the line between the coil 11 and the potentiometer 5, a voltage which is proportional to the speed of the motor 28 and opposes the flow of current from the thermocouple-potentiometer circuit. The circuit 60 includes a transformer 62 having its primary connected to a source of A.-C. supply and its secondary connected across a resistance 63. A movable contactor 64 engages the resistance 63 and is connected through a rectifier 65 and a resistance $R_1$ to one end of the resistance 63. The motor 28 is operatively connected to the contactor 64 for moving the latter along the resistance 63. A conductor 68 connects one end of the resistance $R_1$ through a condenser 69 to one end of the resistance 61 and to an adjustable contactor 70 engaging the resistance 61. A conductor 72 connects the other ends of the resistances $R_1$ and 61, and a condenser $C_1$ is connected across the resistance $R_1$.

Operation of the motor 28 causes the contactor 64 to move along the resistance 63 and produce a varying flow of direct current through the rectifier 65 and the resistance R. While the current flow through the resistance R varies, the condenser 69 passes current to the resistance 61, but as soon as the flow through the resistance R becomes constant, no current passes the condenser 69. The contactor 70 is manually adjusted to produce the desired feedback voltage opposing that of the balancing circuit so as to give the desired deadbeat action.

The feedback voltage $e$ across the resistance 61 may be shown to be proportional to the speed at which the contactor 64 is moved by the motor, as follows:

The A.-C. voltage across the rectifying circuit is proportional to the position of the contactor 64.

$$E_1 = E_{ac} \quad (1)$$

The rectified voltage $E_2$ appearing across the filter circuit $C_1$, $R_1$ is proportional to $E_1$. Hence $$E_2 = K_1 E_{a-c} = K_0 \quad (2)$$

where $K_1$ and $K_0$ are constants.

The current $i$ flowing through the capacitor and feedback resistor R is proportional to the rate of change of D.-C. voltage $E_2$. This may be shown as follows:

$$E_2 = iR + \frac{1}{C_f} i\, dt \quad (3)$$

or $$\frac{dE_2}{dt} = R\frac{di}{dt} + \frac{i}{C_f} \quad (4)$$

The transient part $$R\frac{di}{dt}$$

of Equation 4 is negligible because of the relatively slow rate of change $$\frac{dE_2}{dt}$$

as compared with the time constant of the feedback circuit. Hence the solution of the Equation 4 is nearly $$i = C_f \frac{dE_2}{dt}$$

The feedback voltage $e$ is simply $iR$. Hence $$e = iR = C_f R \frac{dE_2}{dt}$$

Since $E_2 = K_0$ by Equation 2

$$e = k_0 C_f R \frac{d}{dt}$$

Hence $e$ is proportional to the rate of change of the position of the potentiometer contactor 64 as represented by $$\frac{d}{dt}$$

Figs. 2 to 5 show thermocouple-potentiometer circuits like that of Fig. 1, but have associated therewith different forms of feedback circuits. The systems shown in these figures are intended to continue from points A, B, C and D through the bridge, amplifier and motor control circuit of Fig. 1 to control the operation of the motor.

Figure 2:
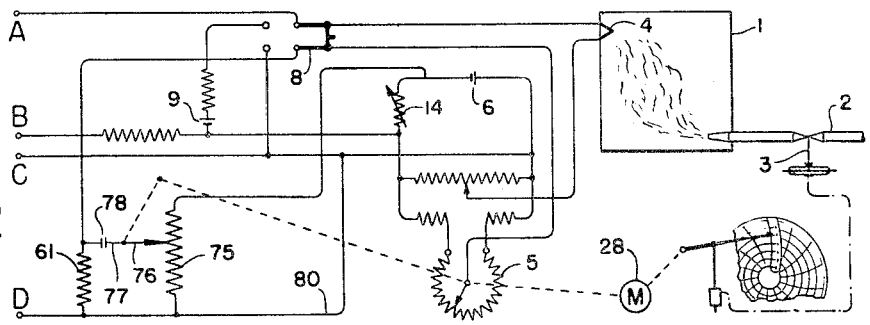
Figs. 2 to 5 show my invention in different forms incorporated in a portion of a system like that of Fig. 1.

In Fig. 2 the feedback circuit includes a resistance 75 connected across the battery 6 of the potentiometer circuit, and having a sliding contactor 76 operatively connected to the motor 28. A conductor 77 connects the contactor 76 through a condenser 78 to one end of the resistance 61, and the other end of the resistance 61 is connected by a conductor 80 to one end of the resistance 75. The main difference between this form and that of Fig. 1 is in the connection of the resistance across a D.-C. power supply 6 rather than across a varying A.-C. voltage through a rectifier.

Figure 3:
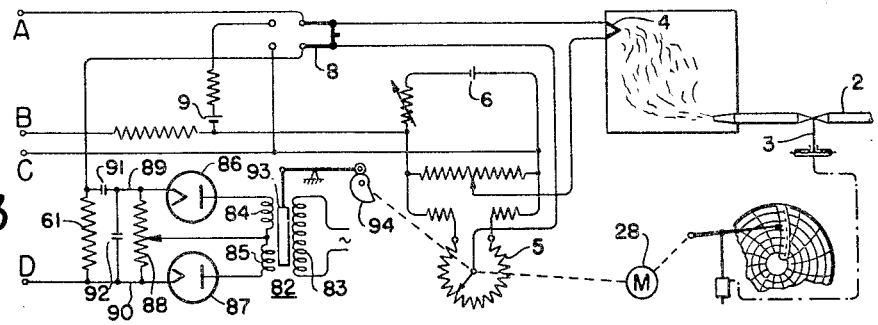

Fig. 3 shows a transformer 82 having its primary winding 83 connected to a source of A.-C. supply. Two oppositely wound secondary windings 84 and 85 are connected at their remote ends to the anodes of rectifier tubes 86 and 87, and connected at their adjacent ends to the mid point of a fixed resistance 88. The ends of the resistance 88 are connected to the cathodes of the tubes and to the ends of the resistance 61 through conductors 89 and 90. Arranged in the conductor 89 is a condenser 91, and connected across the resistance 88 is another condenser 92. Between the primary and secondary windings of the transformer is a core 93 which is positioned by a cam 94 operatively connected to the motor 28. When the temperature of the furnace is at the desired value, the motor and the core which it positions are stationary. A change in the temperature causes an unbalance of the system so that the motor operates to adjust the flow of fuel to the furnace and return the temperature to the desired value. At the same time it changes the positions of the potentiometer contactor 29 and the core 93. Movement of the core 93 from its stationary position causes the induced voltages in the secondary windings 84 and 85 to vary differentially. Current flow through the rectifier tubes 86 and 87 is then changed to cause a change in voltage across the resistance 88. As the voltage across the resistance 88 varies, current passes through the condenser 91 and the resistance 61 to cause an opposition to the flow of current from the thermocouple-potentiometer circuit to the bridge.

Figure 4:
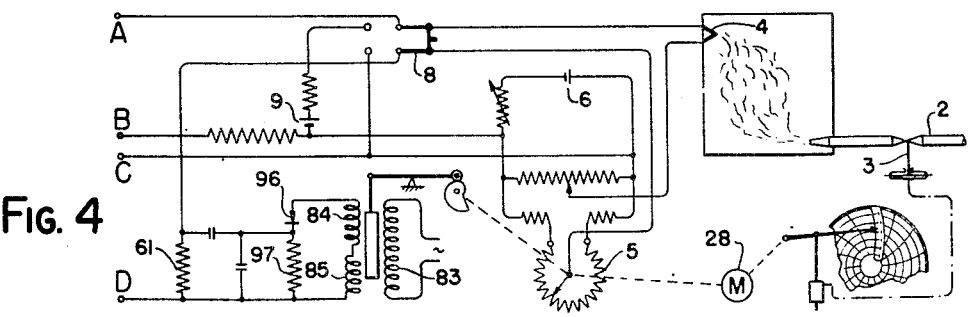

Fig. 4 is similar to Fig. 3 but shows the remote ends of the secondary windings 84, 85 connected together through a single mechanical rectifier 96 and a resistance 97. The operation of this form of the control system is like that of Fig. 3.

Figure 5:
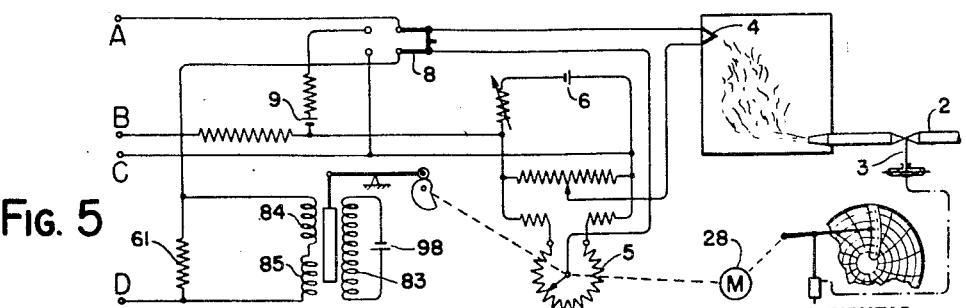

Fig. 5 shows a movable core transformer like that of Figs. 3 and 4, but having its primary winding connected to a source of D.-C. 98 and the remote ends of its secondary windings connected directly to opposite ends of the resistance 61. With this arrangement, voltages are induced in the secondary windings only when the core 93 is moving from one position to another. Current will flow through the resistance 61 in amounts varying with the rate of movement of the core.

As a result of my invention there are provided improved means for controlling the operation of a motor so as to prevent its hunting while regulating the balance of a measuring and control circuit. The motor is started in response to an unbalance of the system and is then retarded an amount varying with its speed.

While there are in this application several forms which my invention may assume in practice, it will be understood that it may be modified and embodied in various other forms without departing from its spirit or the scope of the appended claims.

This application constitutes a division of my application Serial No. 703,146, filed October 14, 1946 now Patent No. 2,482,064, dated September 13, 1949.

What I claim as new, and desire to secure by Letters Patent of the United States, is:

1. A system for measuring an unknown electromotive force including, in combination, a source of known electromotive force, means for opposing the unknown E. M. F. to said known E. M. F., a device operative to vary the magnitude of said known E. M. F., means under the control of the differential between said known and unknown E. M. F. to control the operation of said device, a movable core transformer having a primary winding and oppositely wound secondary windings, means operatively connecting said core to said device, means for connecting said primary winding to a source of alternating current, means for connecting said secondary windings at their remote ends through rectifying means to the opposite ends of a resistance and at their adjacent ends to the mid point of said resistance, and means including a capacitance for connecting said resistance across a portion of said system so as to produce in the latter an E. M. F. opposing the differential between said known and unknown E. M. F.

2. A system for measuring an unknown electromotive force including, in combination, a source of known electromotive force, means for opposing the unknown E. M. F. to said known E. M. F., a device operative to vary the magnitude of said known E. M. F., means under the control of the differential between said known and unknown E. M. F. to control the operation of said device, a movable core transformer having a primary winding and oppositely wound secondary windings, means operatively connecting said core to said device, means for connecting said primary winding to a source of alternating current, means for connecting said secondary windings to the opposite ends of a resistance including rectifier means to produce in the resistance a unidirectional E. M. F. equal to the difference between the E. M. F.'s induced in said secondary windings, and means including a capacitance for connecting said resistance across a portion of said system so as to produce in the latter an E. M. F. opposing the differential between said known and unknown E. M. F.

3. A balanceable electrical network including, in combination, means for producing a variable electromotive force to be measured, a motor adapted to operate in accordance with the magnitude of said electromotive force, means responsive to the magnitude of said electromotive force and operating to control said motor, means positioned by said motor to balance said network following an unbalance thereof caused by a variation of said electromotive force, a movable core transformer having a primary winding and oppositely wound secondary windings connected together at their adjacent ends, means operatively connecting said core to said motor, means for connecting said primary winding to a source of alternating current, a rectifier and a resistance connected in series across said secondary windings, and means including a capacitance for connecting said resistance across a portion of said network so as to produce in the latter an electromotive force opposing the electromotive force to be measured.

4. A balanceable electrical network including, in combination, means for producing a variable electromotive force to be measured, a motor adapted to operate in accordance with the magnitude of said electromotive force, means responsive to the magnitude of said electromotive force and operating to control said motor, means positioned by said motor to balance said network following an unbalance thereof caused by a variation of said electromotive force, a movable core transformer having a primary winding and oppositely wound secondary windings connected together at their adjacent ends, means for connecting said primary winding to a source of direct current, means operatively connecting said core to said motor for movement by the latter in a manner to effect an induction of varying D.-C. voltages in said secondary windings, and means for connecting the remote ends of said secondary winding across a portion of said network so as to produce in the latter an electromotive force opposing the electromotive force to be measured.

5. A balanceable electrical network including, in combination, means for producing a variable electromotive force to be measured, a motor adapted to operate in accordance with the magnitude of said electromotive force, means responsive to the magnitude of said electromotive force and operating to control said motor, means positioned by said motor to balance said network following an unbalance thereof caused by a variation of said electromotive force, a movable core transformer having a primary winding and oppositely wound secondary windings connected together at their adjacent ends, means for subjecting said primary winding to an electromotive force, means operatively connecting said core to said motor for movement by the latter in a manner to effect an induction of varying voltages in said secondary windings, and means for connecting said secondary windings across a portion of said network so as to produce in the latter an electromotive force opposing the electromotive force to be measured and proportional to the rate of movement of said core.

6. The network of claim 5 with the operative connections between the core and the motor including a cam.

ANTHONY J. HORNFECK.

REFERENCES CITED

The following references are of record in the file of this patent:

UNITED STATES PATENTS

| Number | Name | Date |
|---|---|---|
| 1,554,698 | Alexanderson | Sept. 22, 1925 |
| 1,998,458 | Minorsky | Jan. 22, 1935 |
| 2,113,436 | Williams | Apr. 5, 1938 |
| 2,233,415 | Hull | Mar. 4, 1941 |
| 2,367,746 | Williams | Jan. 23, 1945 |
| 2,376,599 | Jones | May 22, 1945 |
| 2,401,168 | Kronenberger | May 28, 1946 |
| 2,482,064 | Hornfeck | Sept. 13, 1949 |
| 2,482,065 | Hornfeck | Sept. 13, 1949 |

FOREIGN PATENTS

| Number | Country | Date |
|---|---|---|
| 489,271 | Great Britain | July 22, 1938 |

OTHER REFERENCES

"Differentiating and Integrating Circuits," Clarke, Electronics, Nov. 1944, pp. 138–142.